(12) United States Patent
Iwamura et al.

(10) Patent No.: US 8,218,505 B2
(45) Date of Patent: *Jul. 10, 2012

(54) MOBILE COMMUNICATION METHOD

(75) Inventors: Mikio Iwamura, Yokohama (JP); Wuri Andarmawanti Hapsari, Yokosuka (JP); Alf Zugenmaier, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/989,803

(22) PCT Filed: Sep. 18, 2009

(86) PCT No.: PCT/JP2009/066423
§ 371 (c)(1),
(2), (4) Date: Feb. 9, 2011

(87) PCT Pub. No.: WO2010/032843
PCT Pub. Date: Mar. 25, 2010

(65) Prior Publication Data
US 2011/0122843 A1    May 26, 2011

(30) Foreign Application Priority Data
Sep. 22, 2008 (JP) ................. 2008-243404

(51) Int. Cl.
*H04W 4/00* (2009.01)
*H04W 36/00* (2009.01)
*H04B 7/005* (2006.01)
*H04B 1/44* (2006.01)

(52) U.S. Cl. ......... 370/331; 370/278; 370/282; 455/438

(58) Field of Classification Search .......... 370/277–278, 370/282, 310, 328, 331, 353; 455/69, 436–439, 455/442–443, 561
See application file for complete search history.

(56) References Cited

U.S. PATENT DOCUMENTS
2009/0025060 A1 *   1/2009   Mukherjee et al. ............... 726/3
(Continued)

FOREIGN PATENT DOCUMENTS
WO    2007/035436 A1    3/2007

OTHER PUBLICATIONS
Extended European Search Report for Application No. 09814687.1, mailed on Mar. 14, 2011 (5 pages).
(Continued)

*Primary Examiner* — Kwang B Yao
*Assistant Examiner* — Redentor Pasia
(74) *Attorney, Agent, or Firm* — Osha • Liang LLP

(57) ABSTRACT

In a mobile communication method according to the present invention includes the steps of: transmitting, from a handover source radio base station to a switching center, a handover request including an Next hop Chaining Count (NCC), a Physical Cell Identification information (PCI) and a $K_{eNB}*$; changing, at the switching center, the NCC, changing, at the switching center, the $K_{eNB}*$ on the basis of the PCI, and transmitting, from the switching center to the handover target radio base station, the handover request including the changed NCC and the changed $K_{eNB}*$; generating, at the handover target radio base station, a first key on the basis of the $K_{eNB}*$; and generating, at the mobile station, the first key on the basis of the NCC and the PCI included in a handover command.

4 Claims, 7 Drawing Sheets

U.S. PATENT DOCUMENTS

| | | | |
|---|---|---|---|
| 2009/0061878 A1* | 3/2009 | Fischer | 455/436 |
| 2009/0168722 A1* | 7/2009 | Saifullah et al. | 370/331 |
| 2010/0002883 A1* | 1/2010 | Sammour et al. | 380/272 |
| 2010/0178920 A1* | 7/2010 | Kitazoe et al. | 455/436 |
| 2011/0059736 A1* | 3/2011 | Norrman et al. | 455/424 |

OTHER PUBLICATIONS

NTT Docomo, Inc. "Multiple KeNB* and ShortMAC-I Forwarding at Handover", 3GPP TSG RAN WG3 61bis, T-doc-R3-082581, Oct. 3, 2008, Prague, Czech Republic, Retrieved from the Internet: URL: http://www.3gpp.org/ftp/tsg_ran/WG3_lu/TSGR3_61bis/docs/.

NTT Docomo, Inc., "Short MAC-I for re-establishment request," 3GPP TSG RAN WG2 #63, T-doc R2-084421, Aug. 22, 2008, 8 pages.

3GPP TR 33.821 V0.8.0, "Technical Specification Group Services and System Aspects; Rationale and track of security decisions in Long Term Evolved (LTE) RAN / 3GPP System Architecture Evolution (SAE)," Apr. 2008, 6 pages.

3GPP TSG SA WG3 Security—S3#52, Change Request, S3-080906, Jun. 27, 2008, 13 pages.

International Search Report issued in PCT/JP2009/066423, mailed on Jan. 12, 2010, with translation, 3 pages.

Written Opinion issued in PCT/JP2009/066423, mailed on Jan. 12, 2010, 3 pages.

Office Action mailed on Jan. 5, 2010 in Japanese Patent Application No. 2009-209830, with translation and verification, 6 pages.

Office Action for Mexican Application No. MX/a/2010/012138 dated Jan. 11, 2012, with English translation thereof (4 pages).

* cited by examiner

FIG. 4

```
SecurityContextInfo ::=      SEQUENCE {
    nextHopChainingCount         NextHopChainingCount,      -- NCC
    key-eNodeB-StarList          Key-eNodeB-StarList,       -- List of KeNB*
    ...
}

Key-eNodeB-StarList ::=      SEQUENCE ( SIZE (1..maxCell) ) OF SEQUENCE {
    physicalCellIdentity         PhysicalCellIdentity,      -- target PCI
    earfcn-DL                    EARFCN-DL,                 -- target EARFCN-DL,
    key-eNodeB-Star              Key-eNodeB-Star            -- KeNB*
}
```

FIG. 7

```
ReestablishmentInfo ::=     SEQUENCE {
    sourcePhysicalCellIdentity    PhysicalCellIdentity,    -- source PCI
    sourceC-RNTI                  C-RNTI,                  -- source C-RNTI
    shortMAC-I-List               ShortMAC-I-List,         -- List of shortMAC-I
    ...
} shortMAC-I-List ::=         SEQUENCE ( SIZE (1 .. maxCell)) OF SEQUENCE {
    cellIdentity                  CellIdentity,            -- target CID
    earfcn-DL                     EARFCN-DL,               -- target EARFCN-DL,
    shortMAC-I                    BIT STRING ( SIZE (16) ) -- shortMAC-I
}
```

MOBILE COMMUNICATION METHOD

TECHNICAL FIELD

The present invention relates to a mobile communication method in which a mobile station performs a handover from a handover source cell under control of a handover source radio base station to a handover target cell under control of a handover target radio base station.

BACKGROUND ART

As shown in FIG. 1, a mobile communication system of the LTE (Long Term Evolution) scheme is configured so that, when a mobile station UE performs a handover from a handover source radio base station (Source eNB) to a handover target radio base station (Target eNB), the handover source radio base station (Source eNB) transmits beforehand a "UE context" of the mobile station UE to the handover target radio base station (Target eNB) during handover preparation processing (Handover Preparation).

Here, the "UE context" includes a "security context" required for "security protection (ciphering and integrity protection)" of an "access stratum (AS)".

The "security protection" of the AS is performed using a security key $K_{eNB}$ commonly used by the radio base station eNB and the mobile station UE.

Note that, in handover processing, the handover source radio base station (Source eNB) is configured to transfer, to the handover target radio base station (Target eNB), not the security key $K_{eNB}$ itself but a parameter "$K_{eNB}*$" derived from the security key $K_{eNB}$ or a parameter "next hop (NH)" previously acquired from a switching center MME.

DISCLOSURE OF THE INVENTION

Problems to be Solved by the Invention

However, in the conventional mobile communication system, the security key $K_{eNB}$ used in communication between the handover target radio base station (Target eNB) and the mobile station UE is generated based on a predetermined rule (KDF: Key Derivation Function) using the parameter $K_{eNB}*$ notified by the handover source radio base station (Source eNB). This allows the handover source radio base station (Source eNB) to know the security key $K_{eNB}$, which leads to a problem of security vulnerability.

The present invention was made in consideration of the foregoing problem. An object of the present invention is to provide a mobile communication method capable of keeping a security key $K_{eNB}$ secret from a handover source radio base station (Source eNB), the security key $K_{eNB}$ being used in communication between a handover target radio base station (Target eNB) and a mobile station UE.

Solution to Problem

A first aspect of the present invention is summarized as a mobile communication method in which a mobile station performs a handover from a handover source cell under control of a handover source radio base station to a handover target cell under control of a handover target radio base station, the mobile communication method comprising the steps of: (A) transmitting, from the handover source radio base station to a switching center, a handover request including a counter, physical cell identification information on the handover target cell and a certain parameter relating to the handover target cell; (B) changing, at the switching center, the counter, and changing, at the switching center, the certain parameter on the basis of the physical cell identification information; (C) transmitting, from the switching center to the handover target radio base station, the handover request including the changed counter and the changed certain parameter; (D) generating, at the handover target radio base station, a first key on the basis of the certain parameter; (E) generating, at the mobile station, the first key on the basis of the counter, the physical cell identification information and a temporary identification information, which are included in a handover command transmitted by the handover target radio base station; and (F) starting communication by using the first key between the mobile station and the handover target radio base station in the handover target cell.

In the first aspect, the handover target radio base station can generate the first key on the basis of a temporary identification information and the certain parameter, the temporary identification information being assigned to the mobile station in the handover target cell.

In the first aspect, in the step (A), the handover source radio base station can transmit physical cell identification information and the certain parameter on a first cell other than the handover target cell.

In the first aspect, in the step (B), the switching center can change the counter, and change all the certain parameter related to the first cell on the basis of the physical cell identification information on the first cell.

A second aspect of the present invention is summarized as a mobile communication method in which a mobile station performs a handover from a handover source cell under control of a handover source radio base station to a handover target cell under control of a handover target radio base station, the mobile communication method comprising the steps of: transmitting, from the handover source radio base station to the handover target radio base station via a switching center, verification information related to the handover target cell and a first cell other than the handover target cell under control of a handover target radio base station; performing, at the mobile station, a cell selection and connection re-establishment to the selected cell, when the handover to the handover target cell by the mobile station has failed; transmitting, from the mobile station to the handover target radio base station, a connection re-establishment request to the first cell including the verification information related to the first cell; and determining, at the handover target radio base station, whether or not the verification information related to the first cell transmitted by the handover source radio base station matches the verification information related to the first cell transmitted by the mobile station.

Effect of the Invention

As described above, according to the present invention, it is possible to provide a mobile communication method capable of keeping a security key $K_{eNB}$ secret from a handover source radio base station (Source eNB), the security key $K_{eNB}$ being used in communication between a handover target radio base station (Target eNB) and a mobile station UE.

BRIEF DESCRIPTION OF THE DRAWINGS

FIG. 4 is a diagram for explaining a method for transmitting a parameter $K_{eNB}*$ in the mobile communication system according to the first embodiment of the present invention.

FIG. 7 is a diagram for explaining a method for transmitting a parameter shortMAC-I in the mobile communication system according to the first embodiment of the present invention.

BEST MODES FOR CARRYING OUT THE INVENTION (Mobile Communication System According to First Embodiment of the Invention)

Figure 1:
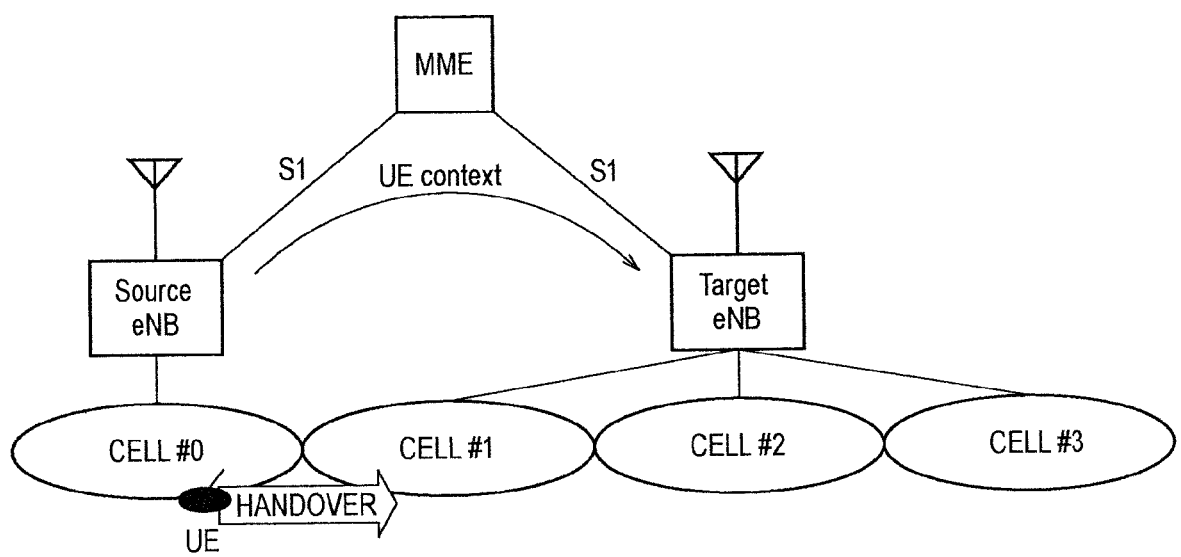
FIG. 1 is an overall configuration diagram of a mobile communication system according to a first embodiment of the present invention.

With reference to FIGS. 1 to 7, a mobile communication system according to a first embodiment of the present invention is described. As shown in FIG. 1, the mobile communication system according to this embodiment is a mobile communication system of the LTE scheme.

In this embodiment, the mobile communication system according to this embodiment is described by taking a case where a mobile station UE performs a handover from a handover source cell (cell #0) under control of a handover source radio base station (Source eNB) to a handover target cell (cell #1) under control of a handover target radio base station (Target eNB).

Figure 2:
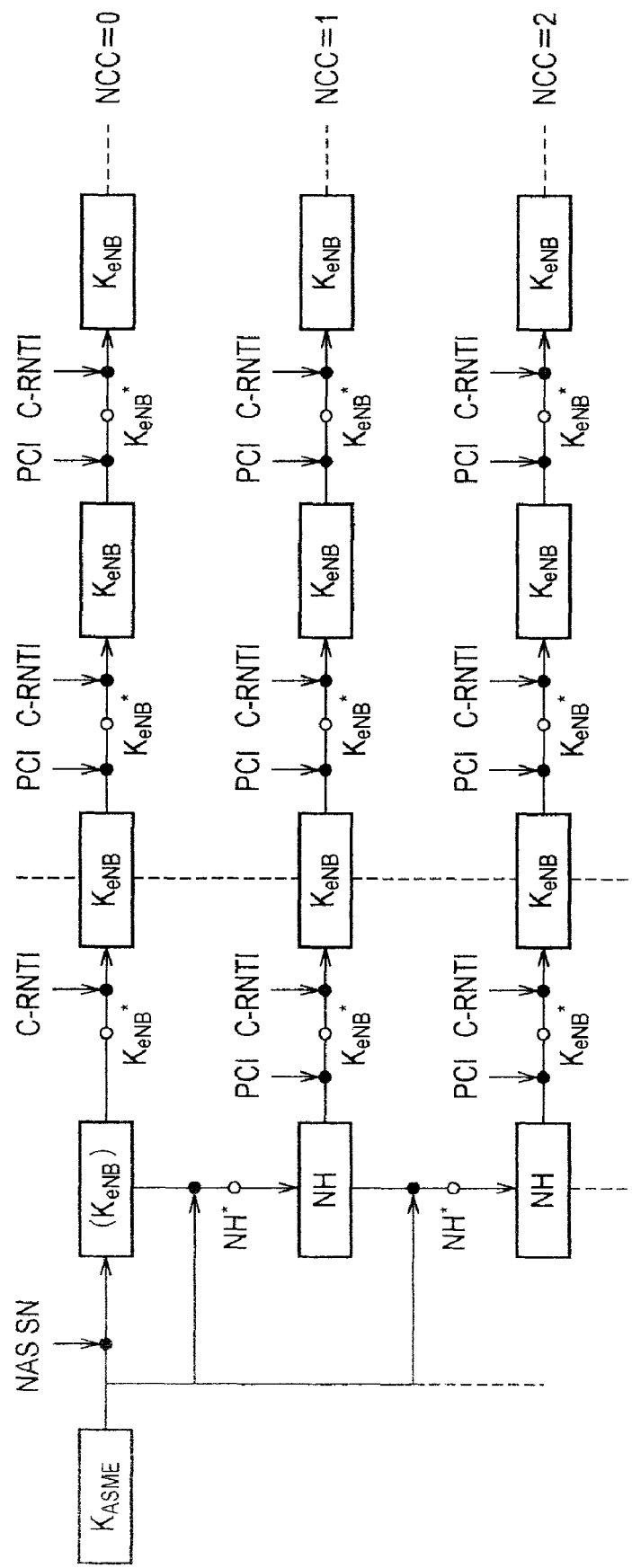
FIG. 2 is a diagram showing how a key $K_{eNB}$ is updated in the mobile communication system according to the first embodiment of the present invention.

As shown in FIG. 2, the handover target radio base station (Target eNB) is configured to generate a security key (first key) $K_{eNB}$ used in communication with the mobile station UE ("security protection" of an AS) in the handover target cell (cell #1), on the basis of a parameter (certain parameter) $K_{eNB}*$ notified from the handover source radio base station (Source eNB), in handover processing.

Note that the handover target radio base station (Target eNB) may be configured to generate the security key (first key) $K_{eNB}$ used in communication with the mobile station UE ("security protection" of the AS) in the handover target cell (cell #1), on the basis of the parameter (certain parameter) $K_{eNB}*$ notified from the handover source radio base station (Source eNB) and an identifier C-RNTI (Cell-Radio Network Temporary ID) assigned to the mobile station UE in the handover target cell (cell #1), in handover processing.

Here, the parameter $K_{eNB}*$ is generated by the handover source radio base station (Source eNB) on the basis of a first key used in communication between the handover source radio base station (Source eNB) and the mobile station UE in the handover source cell (cell #0) and physical cell identification information PCI on the handover target cell (cell #1).

Alternatively, the parameter $K_{eNB}*$ is generated by the handover source radio base station (Source eNB) on the basis of a parameter NH and the physical cell identification information PCI on the handover target cell (cell #1).

Note that the parameter NH is generated by a switching center MME using a key $K_{ASME}$ and is notified to the handover source radio base station (Source eNB).

Figure 3:
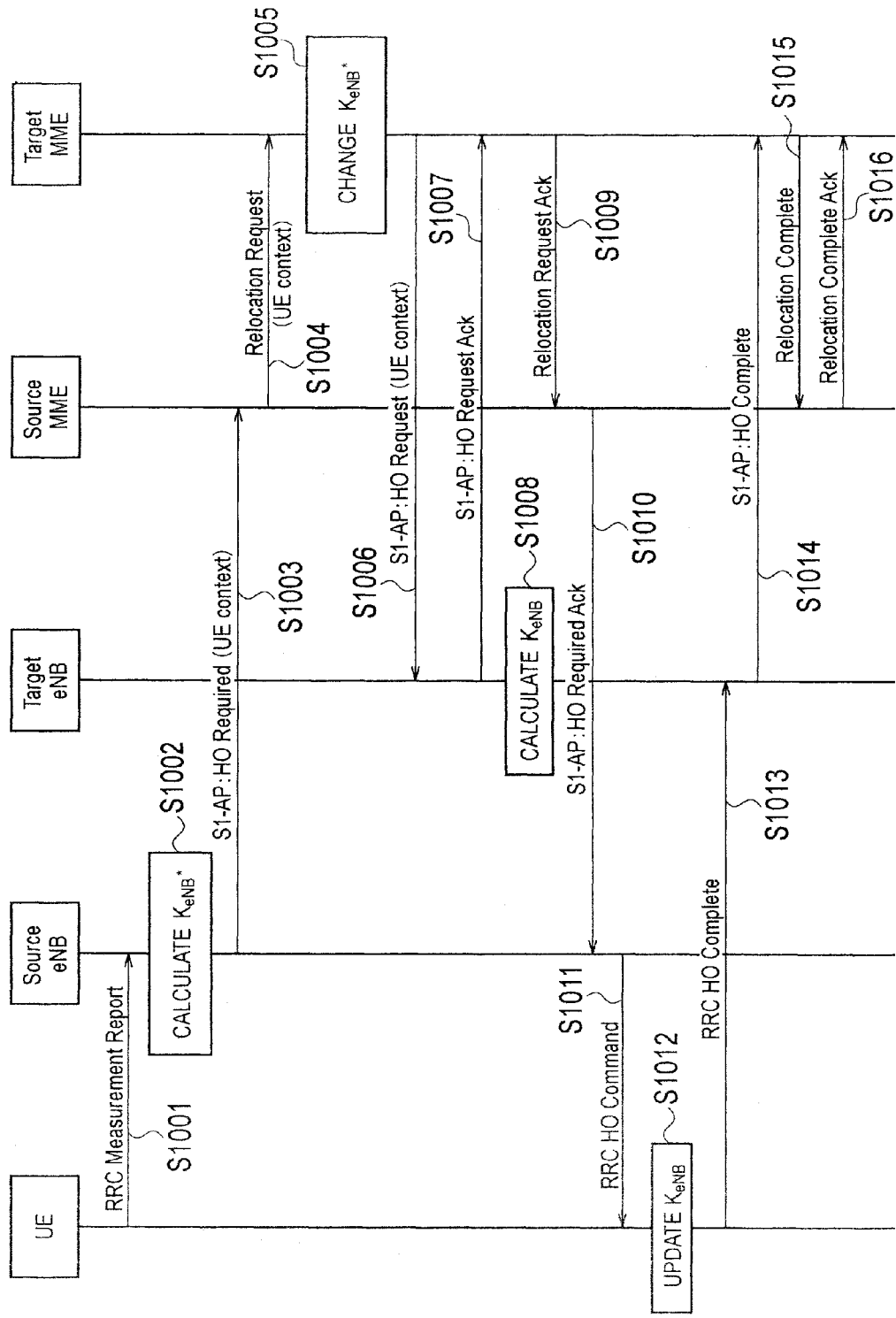
FIG. 3 is a sequence diagram showing a handover operation in the mobile communication system according to the first embodiment of the present invention.
Figure 5:
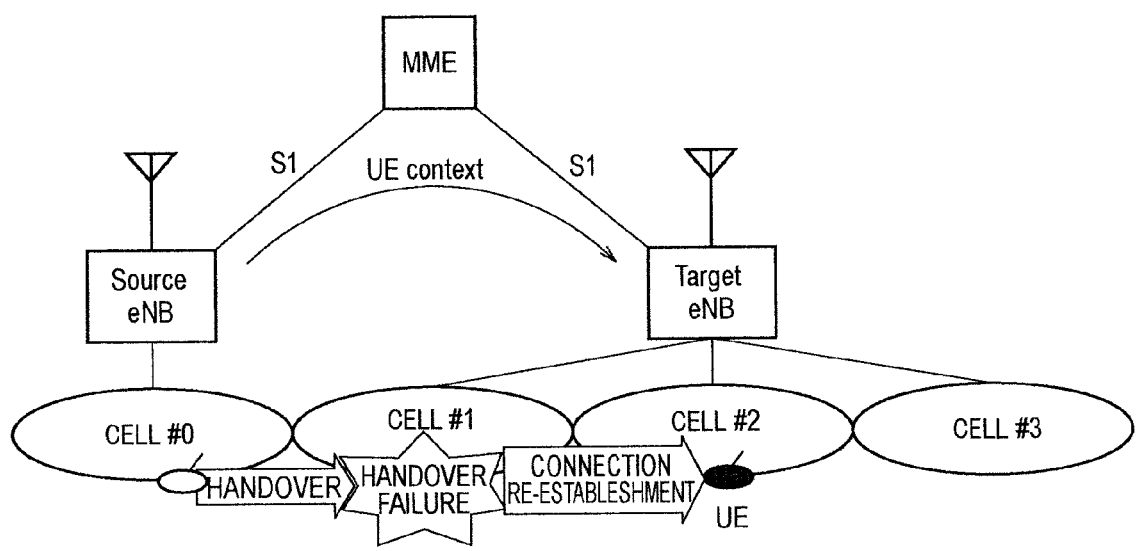
FIG. 5 is a diagram showing how connection re-establishment is performed in the mobile communication system according to the first embodiment of the present invention.

With reference to FIGS. 3 to 5, a description is given below of an operation in a case where the mobile station UE performs a handover from the handover source cell (cell #0) under control of the handover source radio base station (Source eNB) to the handover target cell (cell #1) under control of the handover target radio base station (Target eNB) in the mobile communication system according to the first embodiment of the present invention.

As shown in FIG. 3, in Step S1001, the mobile station UE transmits an "RRC Measurement Report" to the handover source radio base station (Source eNB) that manages the cell (cell #0) with which the mobile station UE is currently in communication.

In Step S1002, the handover source radio base station (Source eNB) determines to cause the mobile station UE to perform a handover to the handover target cell (cell #1) under control of the handover target radio base station (Target eNB), and calculates the parameter $K_{eNB}*$ on the basis of a security key $K_{eNB}$ used in communication with the mobile station UE in the cell #0 and the physical cell identification information PCI on the handover target cell (cell #1).

Alternatively, in Step S1002, the handover source radio base station (Source eNB) determines to cause the mobile station UE to perform a handover to the handover target cell (cell #1) under control of the handover target radio base station (Target eNB), and calculates the parameter $K_{eNB}*$ on the basis of the parameter NH and the physical cell identification information PCI on the handover target cell (cell #1).

In Step S1003, the handover source radio base station (Source eNB) transmits "S1-AP:HO Required" including the parameter $K_{eNB}*$ to a handover source switching center (Source MME).

Here, the "S1-AP:HO Required" includes a counter NCC (Next hop Chaining Count), the physical cell identification information PCI on the handover target cell (cell #1), and the parameter (certain parameter) $K_{eNB}*$ related to the handover target cell (cell #1).

For example, as shown in FIG. 4, the counter NCC, the physical cell identification information PCI on the handover target cell (cell #1), and the parameter $K_{eNB}*$ related to the handover target cell (cell #1) are configured to be transmitted by an information element "SecurityContextInfo" in the "S1-AP:HO Required".

Here, although the information element "SecurityContextInfo" is transmitted as a part of a "UE context", the information element "SecurityContextInfo" is configured to be transmitted not as a "Transparent Container" but as one of the information elements in the "S1-AP:HO Required" in terms of an S1-AP protocol. In this way, the switching center MME can manipulate the "SecurityContextInfo".

Note that the handover source radio base station (Source eNB) may be configured to transmit physical cell identification information PCI (Target PCI) and a parameter $K_{eNB}*$ related to a first cell (cell #2 or cell #3) through the "S1-AP: HO Required", the first cell being a cell other than the handover target cell (cell #1) under control of the handover target radio base station (Target eNB).

In such a case, as shown in FIG. 4, the handover source radio base station (Source eNB) may be configured to transmit a combination of multiple pieces of physical cell identification information PCI (Target PCI) and parameters $K_{eNB}*$ (List of $K_{eNB}*$) for one NCC.

Moreover, as shown in FIG. 4, the handover source radio base station (Source eNB) may be configured to transmit a downlink carrier frequency (Target EARFCN-DL) related to the handover target cell (cell #1), in addition to the counter NCC, the physical cell identification information PCI (Target PCI) on the handover target cell (cell #1), and the parameter $K_{eNB}^*$ related to the handover target cell (cell #1).

In Step S1004, the handover source switching center (Source MME) transmits a "Relocation Request" to a handover target switching center (Target MME).

Here, the handover source switching center (Source MME) and the handover target switching center (Target MME) may be the same switching center.

In Step S1005, the handover target switching center (Target MME) changes the counter NCC included in the "Relocation Request", and changes the parameter $K_{eNB}^*$ included in the "Relocation Request" on the basis of the physical cell identification information (Target PCI) included in the "Relocation Request".

For example, when determining to increment the "NCC" twice, the handover target switching center (Target MME) generates an "NH" corresponding to the "NCC" incremented twice on the basis of the key $K_{ASME}$, and generates a new parameter $K_{eNB}^*$ on the basis of the generated "NH" and the physical cell identification information (Target PCI) included in the "Relocation Request".

Note that the parameter $K_{eNB}^*$ and the like described above are transmitted as the information elements in the S1-AP, which allows the handover source switching center (Source MME) and the handover target switching center (Target MME) to know the parameter $K_{eNB}^*$ and the like described above.

Here, when changing the "NCC", the handover target switching center (Target MME) may change all the parameters $K_{eNB}^*$ corresponding to the "NCC" on the basis of all the pieces of physical cell identification information (Target PCI) corresponding to the "NCC".

In Step S1006, the handover target switching center (Target MME) transmits a "S1-AP:HO Request" including the changed counter NCC, the changed parameter $K_{eNB}^*$ and the physical cell identification information (Target PCI) on the handover target cell to the handover target radio base station (Target eNB).

In Step S1007, the handover target radio base station (Target eNB) transmits a "S1-AP:HO Request Ack" to the handover target switching center (Target MME).

In this event, the handover target radio base station (Target eNB) creates an "RRC HO Command" to be transmitted to the mobile station UE, and transmits the "RRC HO Command" to the handover target switching center (Target MME) after including the "RRC HO Command" in the "S1-AP:HO Request Ack". The "RRC HO Command" includes the counter NCC received from the handover target switching center (Target MME) by using the "S1-AP:HO Request".

In Step S1008, the handover target radio base station (Target eNB) generates a security key (first key) $K_{eNB}$ using a parameter (certain parameter) $K_{eNB}^*$ included in the "S1-AP:HO Request".

To be more specific, the handover target radio base station (Target eNB) generates the security key $K_{eNB}$ on the basis of the parameter $K_{eNB}^*$ included in the "S1-AP:HO Request".

Note that the handover target radio base station (Target eNB) may generate the security key $K_{eNB}$ on the basis of the parameter $K_{eNB}^*$ included in the "S1-AP:HO Request" and the temporary identification information C-RNTI assigned to the mobile station UE in the handover target cell (cell #1).

In Step S1009, the handover target switching center (Target MME) transmits a "Relocation Request Ack" to the handover source switching center (Source MME). In this event, the handover target switching center (Target MME) transmits the "Relocation Request Ack" after including the "RRC HO Command" in the "Relocation Request Ack", the "RRC HO Command" having been included in the "S1-AP:HO Request Ack".

In Step S1010, the handover source switching center (Source MME) transmits a "S1-AP:HO Required Ack" to the handover source radio base station (Source eNB). In this event, the handover source switching center (Source MME) transmits the "S1-AP:HO Required Ack" after including the "RRC HO Command" in the "S1-AP:HO Required Ack", the "RRC HO Command" having been included in the "Relocation Request Ack".

In Step S1011, the handover source radio base station (Source eNB) transmits an "RRC HO Command" to the mobile station UE.

In Step S1012, the mobile station UE generates a parameter (certain parameter) $K_{eNB}^*$ on the basis of the counter NCC included in the "RRC HO Command" in the handover target cell (cell #1) included in the "RRC HO Command", and then generates a security key (first key) $K_{eNB}$ using the parameter $K_{eNB}^*$.

Note that the parameter $K_{eNB}^*$ is generated based on the physical cell identification information PCI on the handover target cell (cell #1) included in the "RRC HO Command" and any one of the parameter NH and the first key $K_{eNB}$ used in communication in the handover source cell on the basis of the counter NCC. The parameter NH is generated in the mobile station UE on the basis of the key $K_{ASME}$ possessed by the mobile station UE.

In Step S1013, the mobile station UE transmits an "RRC HO Complete" to the handover target radio base station (Target eNB). Then, in Step S1014, the handover target radio base station (Target eNB) transmits a "S1-AP:HO Complete" to the handover target switching center (Target MME).

In Step S1015, the handover target switching center (Target MME) transmits a "Relocation Complete" to the handover source switching center (Source MME). Then, in Step S1016, the handover source switching center (Source MME) transmits a "Relocation Complete Ack" to the handover target switching center (Target MME).

Note that, in the handover target cell (cell #1), the mobile station UE and the handover target radio base station (Target eNB) communicate with each other using the security keys (first keys) $K_{eNB}$ generated in Steps S1008 and S1012.

Here, as shown in FIG. 5, the mobile station UE performs a cell selection when the handover to the cell #1 has failed, and then tries to perform connection re-establishment to the newly found cell #2.

To be more specific, the mobile station UE transmits an "RRC Connection Re-establishment Request (connection re-establishment request)" including verification information "shortMAC-I" to the newly found cell #2.

The verification information "shortMAC-I" is like a token (shared secret) for specifying the "UE Context" of the mobile station UE in the radio base station and verifying the validity of the mobile station UE.

The handover source radio base station (Source eNB) transmits a "Handover Preparation (handover preparation signal)" to the handover target radio base station (Target eNB) through the switching center MME, the "Handover Preparation" including the "UE context" including the verification information "shortMAC-I" on the mobile station UE in the handover target cell.

The handover target radio base station (Target eNB) verifies the validity of the mobile station UE by checking if the verification information "shortMAC-I" received from the mobile station UE matches verification information "short- MAC-I" previously transferred from the handover source radio base station (Source eNB).

When the validity is verified, the "RRC Connection Re-establishment" is returned to the mobile station UE. This means that the connection re-establishment has succeeded.

On the other hand, when the handover target radio base station (Target eNB) has failed to confirm the match between the pieces of both verification information or when there is no verification information "shortMAC-I" on the mobile station UE or "UE context" of the mobile station UE, "RRC Connection Re-establishment Reject" is returned to the mobile station UE. This means that the connection re-establishment has failed. When the connection re-establishment has failed, the mobile station UE releases the connection of the AS and is thus set in an RRC_IDLE state.

Accordingly, in the example of FIG. 5, even if the "UE context" of the mobile station UE is stored in the cells #1 to #3 under control of the handover target radio base station (Target eNB), when the verification information "shortMAC-I" on the mobile station UE in the cells #2 and #3 is not stored, connection re-establishment to the cell #2 by the mobile station UE fails.

Figure 6:
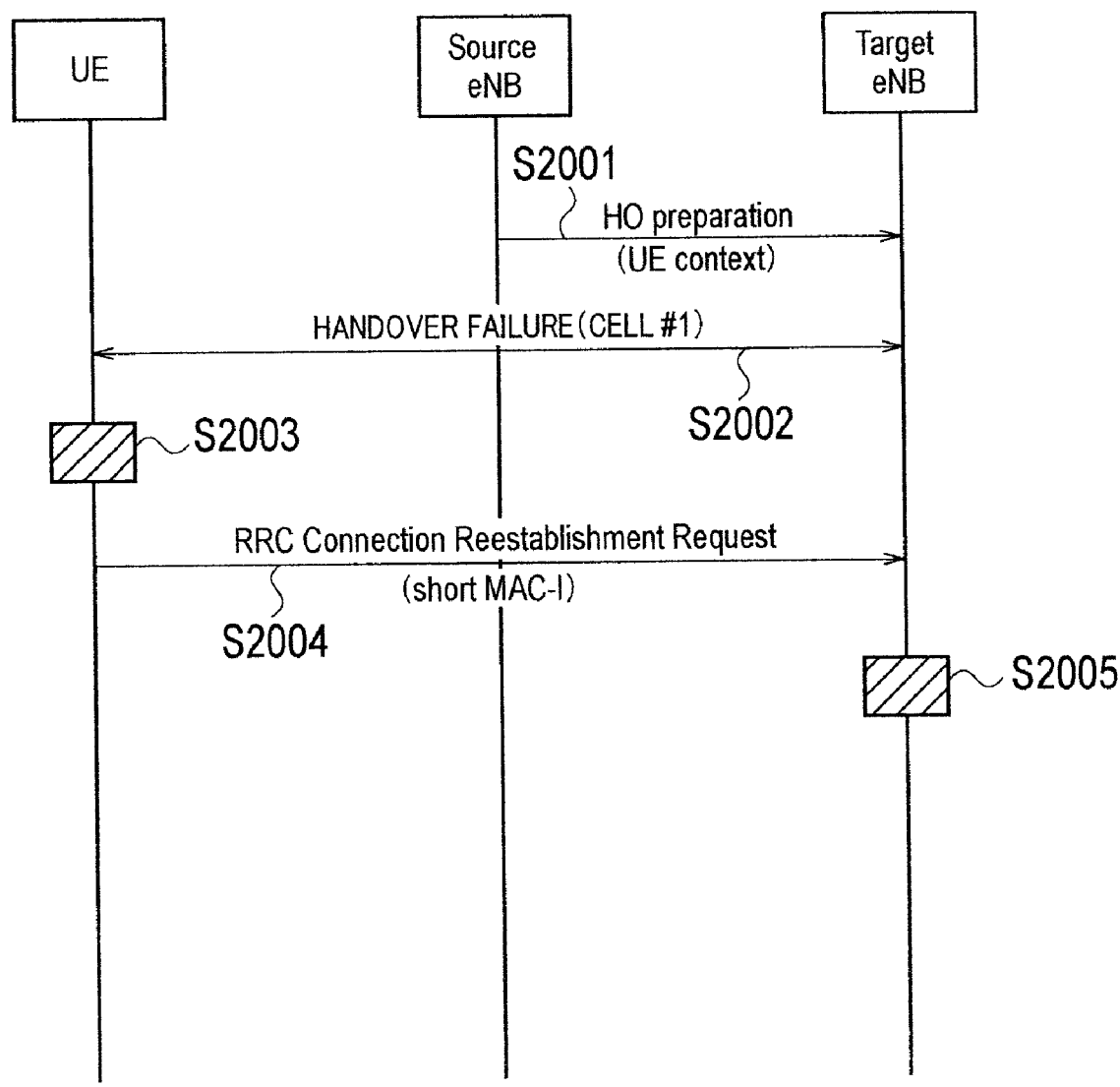
FIG. 6 is a sequence diagram showing operations in handover preparation processing in the mobile communication system according to the first embodiment of the present invention.

With reference to FIGS. 6 and 7, a description is given below of operations in handover preparation processing (Handover Preparation) for making the connection re-establishment processing successful in the above case.

As shown in FIG. 6, in Step S2001, the handover source radio base station (Source eNB) transmits "Handover Preparation" to the handover target radio base station (Target eNB).

Here, the "Handover Preparation (handover preparation signal)" includes physical cell identification information (Source PCI) on the handover source cell (cell #0), an identifier (Source C-RNTI) assigned to the mobile station UE in the handover source cell (cell #0), and verification information (shortMAC-I).

For example, as shown in FIG. 7, the physical cell identification information (Source PCI) on the handover source cell (cell #0), the identifier (Source C-RNTI) assigned to the mobile station UE in the handover source cell (cell #0), and the verification information (shortMAC-I) are configured to be transmitted by an information element "ReestablishmentInfo" in the "Handover Preparation".

Here, the information element "ReestablishmentInfo" is configured to be transmitted as a part of the "UE context".

Note that the handover source radio base station (Source eNB) may be configured to transmit verification information (shortMAC-I) on the first cell (cell #2 or cell #3) through the "Handover Preparation", the first cell being a cell other than the handover target cell (cell #1) under control of the handover target radio base station (Target eNB).

Here, the verification information (shortMAC-I) for each mobile station UE is configured to differ between cells.

When having failed to perform a handover to the cell #1 in Step S2002, the mobile station UE finds a cell #2 as a connection re-establishment target cell in Step S2003.

In Step S2004, the mobile station UE transmits an "RRC Connection Re-establishment Request" including the verification information "shortMAC-I" on the mobile station UE to the handover target radio base station (Target eNB) that manages the cell #2.

Here, having acquired the verification information "shortMAC-I" on the mobile station UE in the cell #2 in Step S2001, the handover target radio base station (Target eNB) determines in Step S2005 whether or not the verification information "shortMAC-I" on the mobile station UE included in the "RRC Connection Re-establishment Request" matches the verification information "shortMAC-I" on the mobile station UE in the cell #2 acquired in Step S2001.

When determining that there is a match between the both pieces of information, the handover target radio base station (Target eNB) determines that the validity of the mobile station UE is verified, and returns "RRC Connection Re-establishment" to the mobile station UE. This means that the connection re-establishment has succeeded.

(Advantageous Effects of Mobile Communication System According to First Embodiment of the Invention)

In the mobile communication system according to this embodiment, the switching center MME can change the parameter $K_{eNB}*$ generated by the handover source radio base station (Source eNB). Accordingly, the security key $K_{eNB}$ can be kept secret from the handover source radio base station (Source eNB), the security key $K_{eNB}$ being used in communication between the handover target radio base station (Target eNB) and the mobile station UE.

In the mobile communication system according to this embodiment, the handover source radio base station (Source eNB) transmits the parameter "$K_{eNB}*$" in the first cell, in addition to the parameter "$K_{eNB}*$" in the handover target cell, the first cell being a cell other than the handover target cell under control of the handover target radio base station (Target eNB). Thus, a failure in connection re-establishment to the first cell storing the "UE context" can be avoided when the mobile station UE has failed to perform a handover to the handover target cell.

In the mobile communication system according to this embodiment, the handover source radio base station (Source eNB) transmits the verification information "shortMAC-I" on the mobile station UE in the first cell, in addition to the verification information "shortMAC-I" on the mobile station UE in the handover target cell, the first cell being a cell other than the handover target cell under control of the handover target radio base station (Target eNB). Thus, a failure in connection re-establishment to the first cell storing the "UE context" can be avoided when the mobile station UE has failed to perform a handover to the handover target cell.

Note that operation of the above described mobile station UE, the radio base station eNB and the switching center MME may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the radio base station eNB and the switching center MME. Also, the storage medium and the processor may be provided in the mobile station UE, the radio base station eNB and the switching center MME as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method in which a mobile station performs a handover from a handover source cell under control of a handover source radio base station to a handover target cell under control of a handover target radio base station, the mobile communication method comprising the steps of:

transmitting, from the handover source radio base station to the handover target radio base station directly or through a switching center, a handover preparation signal including verification information on the handover target cell and a first cell other than the handover target cell under control of the handover target radio base station;

performing, at the mobile station, a cell selection when the handover to the handover target cell has failed;

transmitting, from the mobile station to the handover target radio base station, a connection re-establishment request to the first cell including the verification information related to the first cell, when the first cell is selected in the cell selection; and verifying, at the handover target radio base station, the validity of the mobile station, by using the verification information related to the first cell transmitted by the handover source radio base station and the verification information related to the first cell transmitted by the mobile station.

2. The mobile communication method according to claim 1, further comprising the step of transmitting, from the handover target radio base station to the mobile station, a connection re-establishment acknowledge signal, when the verification information related to the first cell transmitted by the handover source radio base station matches the verification information on the first cell transmitted by the mobile station; and transmitting, from the handover target radio base station to the mobile station, a connection re-establishment reject signal, when the verification information related to the first cell transmitted by the handover source radio base station does not match the verification information on the first cell transmitted by the mobile station.

3. A radio base station functioning as a handover target radio base station when a mobile station performs a handover from a handover source cell under control of a handover source radio base station to a handover target cell under control of the handover target radio base station, the radio base station comprising:

a receiver unit configured to receive, directly or through a switching center, verification information related to the handover target cell and a first cell other than the handover target cell under control of the handover target radio base station, the verification information included in a handover preparation signal transmitted by the handover source radio base station;

the receiver unit further configured to receive a connection re-establishment request including the verification information related to the first cell from the mobile station, when the the handover to the handover target cell by the mobile station has failed; and a determination unit configured to verify the validity of the mobile station, by using the verification information related to the first cell transmitted by the handover source radio base station and the verification information related to the first cell transmitted by the mobile station.

4. The radio base station according to claim 3, further comprising:

a transmitter unit configured to transmit a connection re-establishment acknowledge signal to the mobile station, when the verification information related to the first cell transmitted by the handover source radio base station matches the verification information on the first cell transmitted by the mobile station, and to transmit a connection re-establishment reject signal to the mobile station, when the verification information related to the first cell transmitted by the handover source radio base station does not match the verification information on the first cell transmitted by the mobile station.

* * * * *